(12) United States Patent
Sayyah et al.

(10) Patent No.: US 11,643,194 B2
(45) Date of Patent: May 9, 2023

(54) SYSTEM AND METHOD FOR DYNAMICALLY MEASURING BLADE POSITION DURING FLIGHT OF A ROTORCRAFT

(71) Applicant: THE BOEING COMPANY, Chicago, IL (US)

(72) Inventors: Keyvan Sayyah, Santa Monica, CA (US); Pamela R. Patterson, Los Angeles, CA (US); Raymond Sarkissian, Studio City, CA (US); Oleg M. Efimov, Thousand Oaks, CA (US); Biqin Huang, Torrance, CA (US); David L. Hammon, Simi Valley, CA (US)

(73) Assignee: THE BOEING COMPANY, Chicago, IL (US)

( * ) Notice: Subject to any disclaimer, the term of this patent is extended or adjusted under 35 U.S.C. 154(b) by 536 days.

(21) Appl. No.: 16/717,314

(22) Filed: Dec. 17, 2019

(65) Prior Publication Data

US 2021/0179263 A1 Jun. 17, 2021

(51) Int. Cl.
*B64C 27/00* (2006.01)
*G01S 17/89* (2020.01)
(Continued)

(52) U.S. Cl.
CPC .......... *B64C 27/008* (2013.01); *G01S 7/4817* (2013.01); *G01S 17/06* (2013.01);
(Continued)

(58) Field of Classification Search
CPC ..... B64C 27/008; B64C 27/04; G01S 7/4817; G01S 17/06; G01S 17/66; G01S 17/88; G01S 17/89; G05D 1/0816; B64D 45/0005
See application file for complete search history.

(56) References Cited

U.S. PATENT DOCUMENTS 3,515,485 A 6/1970 Frank
4,053,123 A * 10/1977 Chadwick ............. B64C 27/008
416/114
(Continued)

FOREIGN PATENT DOCUMENTS

EP 0089228 A2 9/1983
EP 3399338 A1 11/2018
(Continued)

OTHER PUBLICATIONS

EP Application No. 20201098.9, extended European Search Report and Written Opinion dated Mar. 31, 2021.
(Continued)

*Primary Examiner* — Marthe Y Marc-Coleman
(74) *Attorney, Agent, or Firm* — Alston & Bird LLP

(57) ABSTRACT

A blade positioning system and method are provided to dynamically measure blade position during flight of a rotorcraft. In the context of a method, a blade of the rotorcraft is repeatedly illuminated by a light source during flight of the rotorcraft while the blade is rotating. The method also includes detecting radiation scattered from the blade in response to illumination of the blade. The method further includes determining at least one of a blade pitch angle, a blade flap angle, a blade leading position or a blade lagging position based upon the radiation that is scattered from the blade and detected. A rotorcraft is also provided that includes a chip-scale light detection and ranging (LIDAR) sensor configured to illuminate the plurality of blades while the blades are rotating in order to permit blade position to be measured or to illuminate terrain beneath the rotorcraft in order to provide an altitude measurement.

20 Claims, 7 Drawing Sheets

(51) Int. Cl.
*G05D 1/08* (2006.01)
*G01S 7/481* (2006.01)
*G01S 17/66* (2006.01)
*G01S 17/88* (2006.01)
*G01S 17/06* (2006.01)

(52) U.S. Cl.
CPC .............. *G01S 17/66* (2013.01); *G01S 17/88* (2013.01); *G01S 17/89* (2013.01); *G05D 1/0816* (2013.01)

(56) References Cited

U.S. PATENT DOCUMENTS

| | | | | |
|---|---|---|---|---|
| 4,887,087 | A | * | 12/1989 | Clearwater ............ G01B 11/16 342/61 |
| 9,310,471 | B2 | | 4/2016 | Sayyah et al. |
| 2010/0063767 | A1 | * | 3/2010 | Moir ..................... B64C 27/008 356/614 |
| 2021/0124031 | A1 | * | 4/2021 | Sarkissian ............. G01S 7/4814 |

FOREIGN PATENT DOCUMENTS

| | | | |
|---|---|---|---|
| GB | 2438315 A | | 11/2007 |
| JP | 2004067055 A | * | 3/2004 |
| WO | WO 89/06623 A1 | | 7/1989 |

OTHER PUBLICATIONS

VL53L1X—Long distance ranging Time-of-Flight sensor based on ST FlightSense technology [online] [retrieved Jan. 24, 2020]. Retrieved via the Internet: https://web.archive.org/web20191219010658/https://www.st.com/en/imaging-and-photonics-solutions/vl53l1x.html (dated Dec. 19, 2019) 4 pages.

* cited by examiner

SYSTEM AND METHOD FOR DYNAMICALLY MEASURING BLADE POSITION DURING FLIGHT OF A ROTORCRAFT

TECHNOLOGICAL FIELD

A system and method are provided for measuring blade position of a rotorcraft and, more particularly, to dynamically measuring blade position during flight of the rotorcraft.

BACKGROUND

Rotorcraft, such as helicopters, includes a plurality of blades that rotate in order to provide lift during flight. Rotorcraft generally provide for a relatively smooth flight in instances in which the blades maintain their predefined blade position, such as in terms of blade pitch angle, blade flap angle and the leading or lagging position of the blade. Sometimes, however, the blade position may change from the desired blade position, such as by having a different blade pitch angle, a different blade flap angle and/or being positioned in a leading or lagging position. In these instances, the flight of the rotorcraft oftentimes becomes less smooth, thereby potentially diminishing the flight experience of the crew and any passengers and/or potentially creating issues for cargo carried by the rotorcraft.

In these instances in which the blade position has varied, the blades of the rotorcraft cannot be repositioned so as to again be in the predefined blade position at least until the rotorcraft has completed its flight. In some instances, the blades of a rotorcraft cannot be repositioned even upon the completion of the flight and, instead, must await return of the rotorcraft to a maintenance depot or other facility that is capable of effecting such repairs. As such, the potentially rougher flight conditions created by variations in the blade position may not be addressed as quickly as may be desirable.

BRIEF SUMMARY

A blade positioning system and method are provided in accordance with an example embodiment in order to dynamically measure blade position during flight of a rotorcraft. Based upon the dynamically modified blade position, the rotorcraft of an example embodiment may be configured to modify the position of a blade during flight of the rotorcraft. Consequently, the dynamic measurement of the blade position and, in some embodiments, the in-flight modification of the blade position permit a return to smoother flight conditions in a more expeditious manner, such as during the flight itself without awaiting the completion of the flight and/or the return of the rotorcraft to a maintenance depot or other repair facility. The blade positioning system and method of an example embodiment utilize a track sensor, such as a chip-scale light detection and ranging (LIDAR) sensor, carried by the fuselage of the rotorcraft so as not to add appreciably to the size and weight of the rotorcraft. While the chip-scale LIDAR sensor may be utilized in order to measure blade position, the rotorcraft of another example embodiment may utilize the chip-scale LIDAR sensor as an altimeter, such as to facilitate landing of the rotorcraft.

In an example embodiment, a method is provided for dynamically measuring blade position during flight of a rotorcraft. The method includes repeatedly illuminating a blade of the rotorcraft with coherent light during flight of the rotorcraft while the blade is rotating. The method also includes detecting radiation scattered from the blade in response to illumination of the blade. The method further includes determining at least one of a blade pitch angle, a blade flap angle, a blade leading position or a blade lagging position based upon the radiation that is scattered from the blade and detected.

The method of an example embodiment repeatedly illuminates the blade of the rotorcraft at a location closer to a distal end of the blade than a rotor mast about which the blade is rotated. In an example embodiment, the method repeatedly illuminates the blade with a plurality of track sensors positioned at different locations upon a fuselage of the rotorcraft.

In an example embodiment, the method determines the blade pitch angle by determining a range to the blade based upon the radiation that is scattered from the blade and detected and then determining the blade pitch angle based upon a width of the blade and a deviation in the range to the blade relative to the range to a reference blade position without pitch. In this example embodiment in which the blade is repeatedly illuminated by radiation generated by a laser source, the method determines the range to the blade by determining the range between the laser source and an edge of the blade.

In an example embodiment, the method determines the blade flap angle by determining a range to the blade based upon the radiation that is scattered from the blade and detected and then determining the blade flap angle based upon a length of the blade and a deviation in the range to the blade relative to the range to a reference blade position without flap. In another example embodiment, the method determines the blade leading position or the blade lagging position by detecting the presence of the blade at a predefined location within a rotational path of the blade and determining a detection time at which the presence of the blade is detected. The method of this example embodiment then determines a blade position based upon a relationship of the detection time to a predetermined time associated with a reference blade that neither leads nor lags. In this regard, the method determines the blade position by determining the blade leading position in an instance in which the detection time precedes the predetermined time and determining a blade lagging position in an instance in which the detection time trails the predetermined time.

In another example embodiment, a blade positioning system is provided for dynamically measuring blade position during flight of a rotorcraft. The blade positioning system includes a track sensor mounted upon the rotorcraft. The track sensor includes a laser source configured to repeatedly illuminate a blade of the rotorcraft with coherent light during flight of the rotorcraft while the blade is rotating. The track sensor also includes at least one photodetector configured to detect radiation scattered from the blade in response to illumination of the blade. The system of this example embodiment also includes processing circuitry, responsive to the track sensor, configured to determine at least one of a blade pitch angle, a blade flap angle, a blade leading position or a blade lagging position based upon the radiation that is scattered from the blade and detected by the at least one photodetector.

The track sensor of an example embodiment is mounted upon the rotorcraft such that the light source is configured to repeatedly illuminate the blade at a location closer to a distal end of the blade than a rotor mast about which the blade is rotated. In an example embodiment, the blade positioning system also includes a plurality of track sensors mounted at different locations upon the rotorcraft.

The processing circuitry of an example embodiment is configured to determine the blade pitch angle by being configured to determine a range to the blade based upon the radiation that is scattered from the blade and detected and to determine the blade pitch angle based upon a width of the blade and a deviation in the range to the blade relative to a range to a reference blade position without pitch. The processing circuitry of this example embodiment is configured to determine the range by determining the range between the laser source and an edge of the blade.

The processing circuitry of an example embodiment is configured to determine the blade flap angle by determining a range to the blade based upon the radiation that is scattered from the blade and detected and to determine the blade flap angle based upon a length of the blade and a deviation in the range to the blade relative to a range to a reference blade position without flap. In another example embodiment, the track sensor is configured to detect the presence of the blade at a predefined location within a rotational path of the blade and the processing circuitry is configured to determine a detection time at which the presence of the blade is detected. In this example embodiment, the processing circuitry is configured to determine a blade position based upon a relationship of the detection time to a predetermined time associated with a reference blade that neither leads nor lags. The processing circuitry of this example embodiment is configured to determine the blade position by determining the blade leading position in an instance in which the detection time precedes the predetermined time and determining the blade lagging position in an instance in which the detection trails the predetermined time.

In a further example embodiment, a rotorcraft is provided that includes a fuselage, a plurality of blades configured to rotate relative to the fuselage and a chip-scale light detection and ranging (LIDAR) sensor carried by the fuselage. The chip-scale LIDAR sensor includes a laser source configured to provide illumination with coherent light during flight of the rotorcraft and at least one photodetector configured to detect radiation that has been scattered in response to the illumination provided by the laser source. The chip-scale LIDAR sensor is carried by the fuselage such that the laser source is configured to illuminate the plurality of blades while the blades are rotating in order to permit blade position to be measured or to illuminate terrain beneath the rotorcraft in order to provide an altitude measurement.

The laser source of an example embodiment includes a frequency modulated continuous wave laser diode. The at least one photodetector of an example embodiment includes a pair of dual-balanced photodetectors. The chip-scale LIDAR sensor of an example embodiment also includes a splitter configured to split light generated by the laser source into first and second portions with the first portion being directed to illuminate the plurality of blades while the blades are rotating or to illuminate terrain beneath the rotorcraft. The chip-scale LIDAR sensor of this example embodiment also includes a waveguide configured to support propagation of the second portion of light generated by the laser source and a coupler configured to couple the second portion of the light propagating along the waveguide with the radiation that has been scattered in response to the illumination provided by the laser source. The at least photodetector of this example embodiment is responsive to the coupler and is configured to receive the second portion of the light propagating along the waveguide as well as the radiation that has been scattered in response to the illumination provided by the laser source.

The rotorcraft of this example embodiment also includes processing circuitry, responsive to the chip-scale LIDAR sensor, configured to determine at least one of a blade pitch angle, a blade flap angle, a blade leading position or a blade lagging position based upon the radiation that is scattered from a respective blade of the plurality of blades and detected by the at least one photodetector. The rotorcraft of this embodiment also includes an actuator, responsive to the processing circuitry, configured to modify a position of the respective blade during flight based upon at least one of blade pitch angle, the blade flap angle, the blade leading position or the blade lagging position as determined by the processing circuitry.

BRIEF DESCRIPTION OF THE DRAWINGS

Having described certain examples of the present disclosure in general terms above, reference will now be made to the accompanying drawings, which are not necessarily drawn to scale and wherein.

DETAILED DESCRIPTION

Some examples of the present disclosure will now be described more fully hereinafter with reference to the accompanying drawings, in which some, but not all examples of the present disclosure are shown. Indeed, the present disclosure may be embodied in many different forms and should not be construed as limited to the examples set forth herein; rather, these examples are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with examples of the present disclosure. Thus, use of any such terms should not be taken to limit the spirit and scope of the present disclosure.

A system and method are provided in accordance with an example embodiment in order to dynamically measure the blade position during flight of a rotorcraft. By measuring the blade position during flight of the rotorcraft, the rotorcraft of an example embodiment may be configured to modify the blade position during the flight, thereby providing for improved flight performance, such as a smoother flight, without awaiting completing of the flight and/or return of the rotorcraft to a maintenance depot or other facility equipped to reposition the blades.

Figure 1:
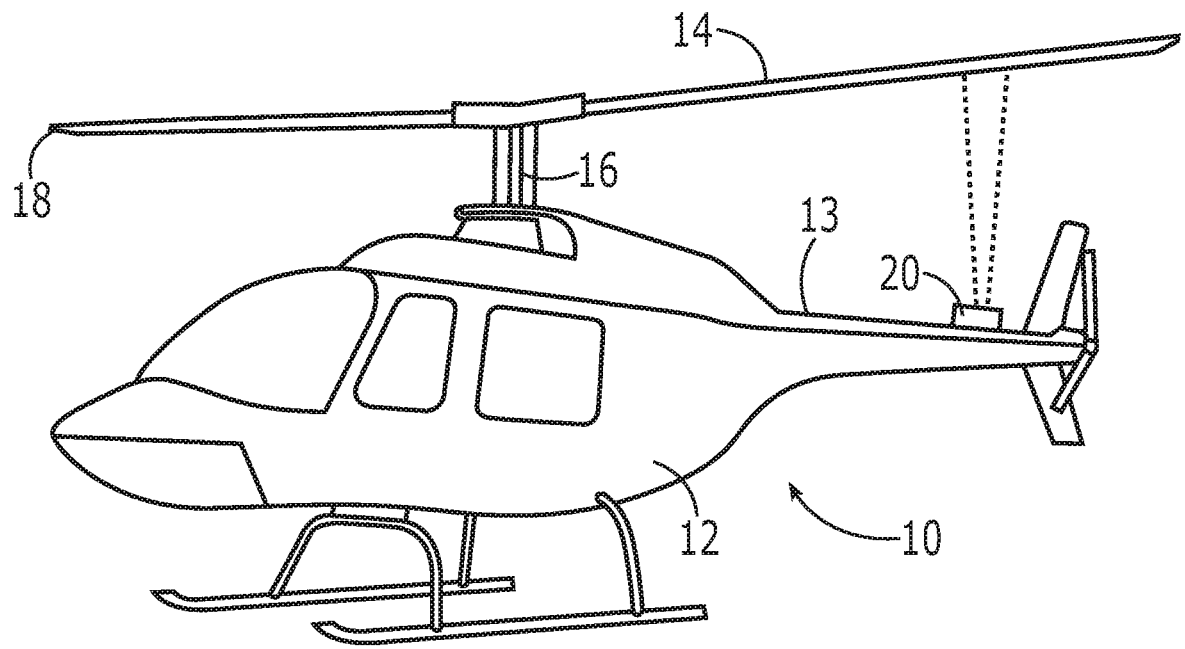
FIG. 1 is a perspective view of a rotorcraft having a track sensor, such as a chip-scale light detection and ranging (LIDAR) sensor, carried by the fuselage of the rotorcraft and configured to repeatedly illuminate the blades of the rotorcraft during flight in accordance with an example embodiment of the present disclosure.

The various types of rotorcraft may benefit from the dynamic measurement of blade position during flight. By way of example, but not of limitation, FIG. 1 depicts a rotorcraft 10 in the form of a helicopter which will be referenced throughout in order to illustrate the system and method for dynamically measuring blade position in accordance with an example embodiment. As shown, the rotorcraft 10 includes a fuselage 12 and a plurality of blades 14 configured to rotate relative to the fuselage. In this example embodiment, the rotorcraft 10 includes a rotor mast 16 to which the blades 14 are operably connected and about which the blades are configured to rotate. In the example embodiment depicted in FIG. 1, the rotorcraft 10 also includes a track sensor 20 mounted upon the rotorcraft and, more particularly, mounted upon an upper surface 13 of the fuselage 12. In this regard, the track sensor 20 is mounted upon that portion of the upper surface 13 of the fuselage 12 that is within the path of rotation of the blades 14 such that the blades pass over the track sensor during rotation of the blades, such as during flight.

Figure 2:
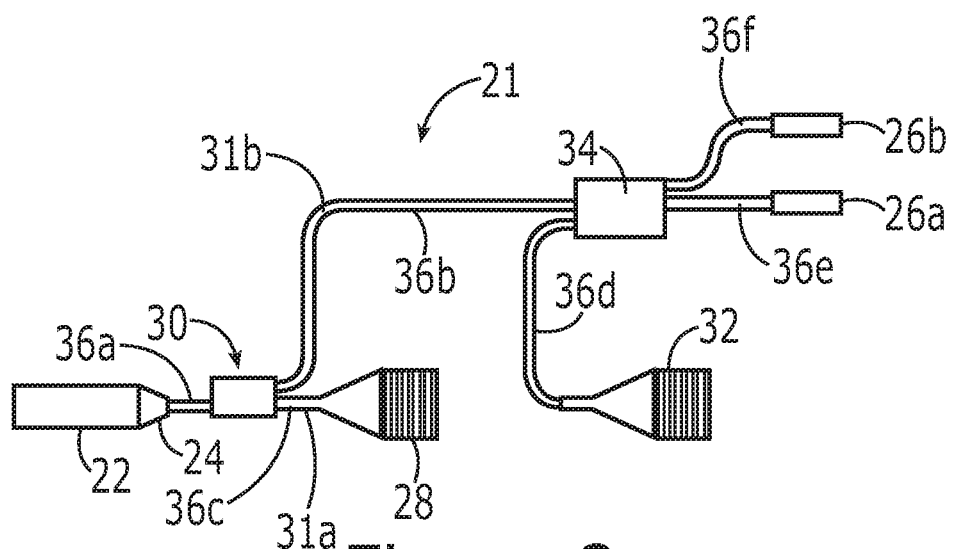
FIG. 2 is a schematic representation of a chip-scale LIDAR sensor in accordance with an example embodiment of the present disclosure.

Although the track sensor 20 may be configured in various manners, the track sensor of an example embodiment is a chip-scale laser detection and ranging (LIDAR) sensor. The chip-scale LIDAR sensor may be embodied by an integrated circuit package and, as such, may add little in terms of weight and size to the rotorcraft 10 upon which the chip-scale LIDAR sensor is mounted. Although the chip-scale LIDAR sensor may be configured in various manners, as shown in FIG. 2, the chip-scale LIDAR sensor 21 of an example embodiment includes a laser source 22 configured to generate radiation, e.g., coherent light, that is directed to illuminate one or more blades 14 of the rotorcraft 10. In an example embodiment, the laser source 22 is a laser diode. The laser diode may be a single-spectral mode laser diode.

In one embodiment, the laser diode is a distributed Bragg reflector (DBR) laser diode or a distributed feedback (DFB) laser diode that is heterogeneously integrated on the underlying substrate. In an example embodiment, the laser diode is a frequency modulated continuous wave (FMCW) laser diode to enable FMCW LIDAR operation.

The chip-scale LIDAR sensor 21 of the embodiment of FIG. 2 also includes at least one photodetector 26 and, in an example embodiment, a pair of photodetectors 26a, s26b in a dual-balanced configuration. Each of the one or more photodetectors 26 of the example embodiment is a (PIN) photodiode. The photodetector(s) 26 may be monolithically integrated, such as in an embodiment in which the photodetector(s) are Germanium (Ge)-on-Silicon (Si) photodiodes, or heterogeneously integrated on two additional grating couplers which vertically couple the photodetector(s) to the underlying waveguides. In order to illuminate a blade 14 of the rotorcraft 10 during flight, the chip-scale LIDAR sensor 21 of the illustrated embodiment includes an output coupler 28 (also referred to herein as an outcoupler), such as a transmission beam grating outcoupler, that receives the radiation generated by the laser source 22 and that directs the light toward a blade 14 of the rotorcraft 10. The light directed by the output coupler 28 toward a blade 14 of the rotorcraft 10 may be collimated, such as by an off-chip collimating lens.

In the illustrated embodiment, not all of the radiation generated by the laser source 22 serves to illuminate a blade 14 of the rotorcraft 10. Instead, the chip-scale LIDAR sensor 21 includes a splitter 30, such as a 1×2 splitter, configured to receive the radiation generated by the laser source 22 and to split the radiation into a first portion 31a that is directed to and serves to illuminate the blade 14 of the rotorcraft 10, such as via the output coupler 28, and a second portion 31b that is directed toward the at least one photodetector 26a and/or 26b. Although the splitter 30 may be configured to split the radiation generated by the laser source 22 between the first and second portions 31a, 31b in various proportions, the splitter of an example embodiment splits the radiation generated by the laser source such that the first portion that illuminates the blade 14 is larger, such as in terms of intensity, than the second portion that is directed toward the at least one photodetector 26. For example, the splitter 30 may be configured such that the first portion 31a includes 75% to 95% of the radiation generated by the laser source 22 and, in one embodiment, 90% to 95% of the radiation generated by the laser source and the second portion 31b includes the remainder of the radiation, such as 25% to 5% of the radiation generated by the laser source and, in one embodiment, 10% to 5% of the radiation generated by the laser source. In an example embodiment, the splitter 30 may be a directional coupler/splitter or a multi-mode interference (MMI) coupler splitter. The second portion 31b of the radiation may serve as a local oscillator (LO) beam.

In the illustrated embodiment, the chip-scale LIDAR sensor 21 also includes an input coupler 32 (also referred to herein as an incoupler), such as a receive beam incoupler. In operation, the input coupler 32 is configured to receive the radiation scattered from the blade 14 in response to illumination by the light generated by the laser source 22 and then direct the received radiation to the at least one photodetector 26a and/or 26b. In the illustrated embodiment, the input coupler 32 directs the received radiation to each of the pair of dual-balanced photodetectors 26a and/or 26b. In the illustrated embodiment, the chip-scale LIDAR sensor 21 also includes a coupler 34, such as a 2×2 coupler, namely, a 50:50 2×2 coupler. In operation, the coupler 34 is configured to optically combine, e.g., mix, the radiation received by the input coupler 32, such as radiation scattered from the blade 14, with the second portion 31b of the radiation, that is, the LO beam, generated by the laser source 22 and to evenly split the combination to each of the photodetector(s) 26a and 26b. The coupler 34 of an example embodiment may be a directional or MMI coupler. In the illustrated embodiment, the coupler 34 provides the combined radiation to the pair of dual-balanced photodetectors 26a and 26b.

As shown in FIG. 2, the plurality of components of the chip-scale LIDAR sensor 21 may be connected by waveguides 36, such as a network of integrated photonic waveguides, e.g., silicon-based waveguides. In the illustrated embodiment, the network of waveguides includes a first waveguide 36a configured to direct radiation generated by the laser source 22 to the splitter 30, a second waveguide 36b configured to direct the second portion 31b of the radiation from the splitter to the coupler 34 and a third waveguide 36c configured to direct the first portion 31a of the radiation from the splitter to the output coupler 28. The network of waveguides of the illustrated embodiment may also include a fourth waveguide 36d configured to direct the received radiation from the input coupler 32 to the coupler 34 and fifth and sixth waveguides 36e and 36f configured to direct a portion of the received radiation from the coupler to the pair of balanced photodetectors 26a and 26b, respectively. The waveguides 36 may be integrated with the substrate and exhibit relatively low loss, such as less than 4 dB/cm. In this regard, the light generated by the laser source 22 may be coupled to the first waveguide 26a by a spatial mode converter 24 that matches the larger optical spatial mode of the laser source 22 to the smaller mode of the first waveguide.

Figure 3:
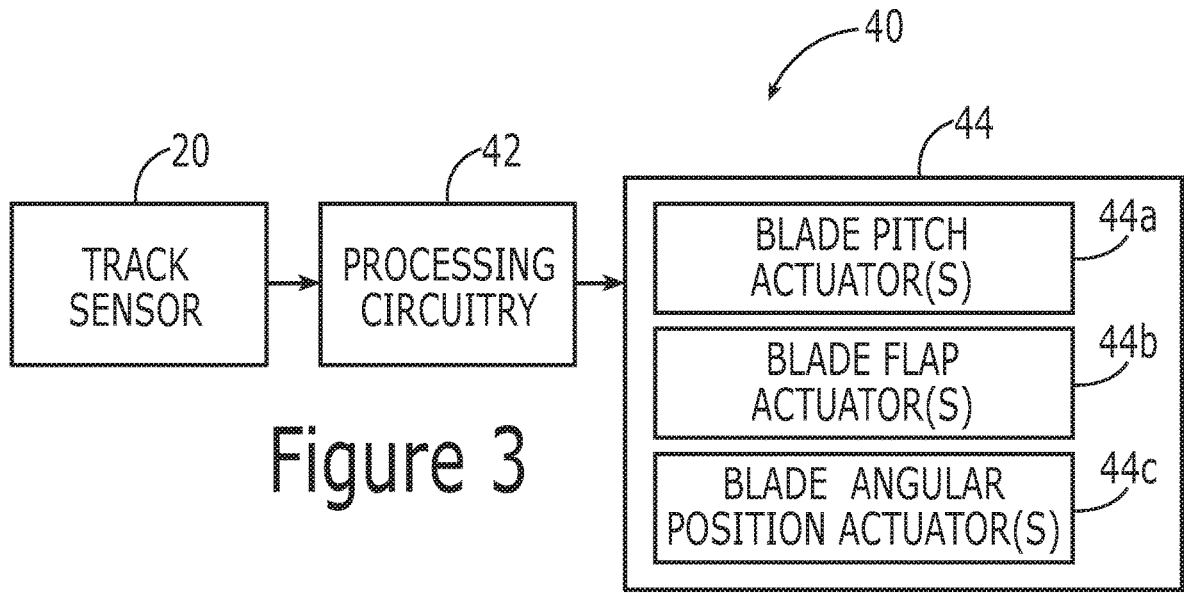
FIG. 3 is a block diagram of a blade positioning system including a track sensor, such as a chip-scale LIDAR sensor, in accordance with an example embodiment of the present disclosure.

As shown in an example embodiment depicted in FIG. 3, the track sensor 20, such as a chip-scale LIDAR sensor 21, is a component of blade positioning system 40 that also includes processing circuitry 42. In operation, the blade positioning system 40 is configured to dynamically measure blade position during flight of a rotorcraft 10. In some embodiments, the blade positioning system 40 is also configured to reposition a blade 14 based upon the dynamic measurements of blade position during flight of the rotorcraft 10.

The processing circuitry 42 of the blade positioning system 40 is responsive to the track sensor 20, such as the signals captured by the at least one photodetector 26 of the chip-scale LIDAR sensor 21, in order to determine the blade position and/or the altitude of the rotorcraft 10. The processing circuitry 42 may be embodied in a number of different ways and may, for example, include one or more processing devices configured to perform independently. Additionally or alternatively, the processing circuitry 42 may include one or more processors configured in tandem via a bus to enable independent execution of software instructions, pipelining, and/or multithreading. The use of the terms "processor" or "processing circuitry" may be understood to include a single core processor, a multi-core processor, multiple processors, remote or "cloud" processors, or any combination thereof.

In an example, the processing circuitry 42 may include one or more dedicated processors, controllers, specially configured field programmable gate arrays (FPGAs), or application specific interface circuits (ASICs) to perform its corresponding functions. The processing circuitry 42 may additionally or alternatively be implemented using a processor executing software stored in a memory device. In this fashion, the processing circuitry 42 may therefore be implemented using special-purpose components implemented purely via hardware design or may utilize hardware components that execute computer software designed to facilitate performance of the functions of the processing circuitry.

The processing circuitry 42 may also include or be associated with a memory device and the processing circuitry of this example may be configured to execute software instructions stored in the memory device or otherwise accessible to the processing circuitry. In this example, the memory device may be configured to store information, data, content, applications, software instructions, or the like, for enabling the processing circuitry 42 to carry out various functions in accordance with examples contemplated herein. Alternatively or additionally, the processing circuitry 42 may be configured to execute hard-coded functionality. As such, whether configured by hardware or software methods, or by a combination of hardware with software, the processing circuitry 42 may represent an entity (e.g., physically embodied in circuitry) capable of performing operations according to an example of the present disclosure while configured accordingly. Alternatively, as another example, when the processing circuitry 42 is embodied as an executor of software instructions, the software instructions may specifically configure the circuitry to perform the algorithms and/or operations described herein when the software instructions are executed.

Figure 4:
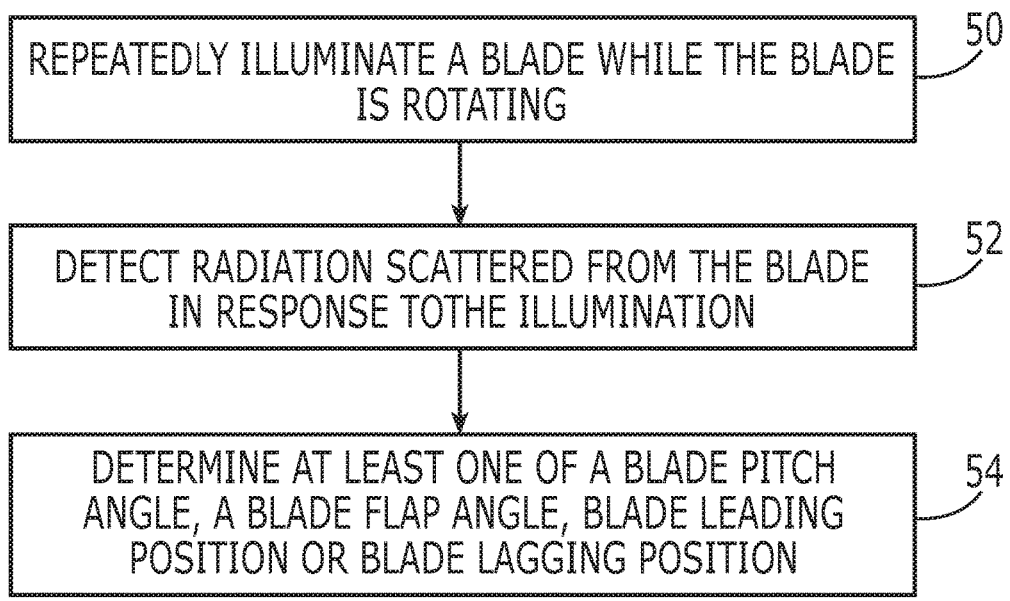
FIG. 4 is a flowchart illustrating operations performed, such as by the blade positioning system of FIG. 3, in accordance with an example embodiment of the present disclosure.

The operations performed, such as by the blade positioning system 40 of FIG. 3, in order to dynamically measure blade position during flight of a rotorcraft 10 in accordance with an example embodiment are depicted in FIG. 4. As shown in block 50 of FIG. 4, a blade 14 of the rotorcraft 10 is repeatedly illuminated during flight of the rotorcraft while the blade is rotating. In this regard, the laser source 22 of the track sensor 20 is configured to generate radiation, e.g., light, that repeatedly illuminates the rotating blade 14 of the rotorcraft 10. As shown in FIG. 1, for example, the track sensor 20 is preferably mounted on the upper surface 13 of the fuselage 12 of the rotorcraft so as to underlie the path of rotation of the plurality of blades 14 such that the blades extend radially beyond the track sensor and pass over the track sensor during rotation. The track sensor 20 of this example embodiment is positioned so as to direct the radiation generated by the laser source 22 upwardly towards the plurality of blades 14 that pass over the track sensor during rotation of the blades, as shown by the dashed lines in FIG. 1.

The track sensor 20, such as the laser source 22, may be configured to repeatedly illuminate a blade 14 of the rotorcraft 10 during rotation of the blade by generating pulses of radiation, e.g., laser pulses, such as on a periodic basis. Depending upon the frequency with which the pulses are generated, the track sensor 20 may be configured to separately illuminate the blade 14 a plurality of times during a single pass of the blade over the track sensor. Alternatively, the track sensor 20 may be configured to illuminate a blade 14 during each rotation of the blade over the track sensor. In either instance, the track sensor 20 is configured to repeatedly illuminate the blade as the blade 14 is rotating.

Figure 6:
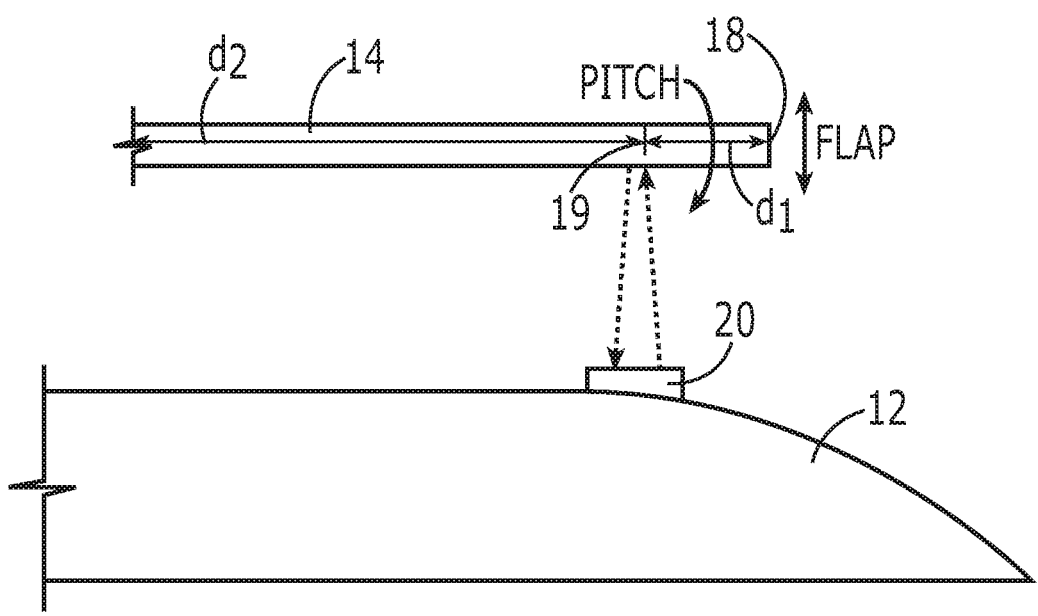
FIG. 6 is a side view of a distal portion of a blade of a rotorcraft depicting the relative position of a track sensor with respect to the blade in accordance with an example embodiment of the present disclosure.

As shown in block 52 of FIG. 4, radiation scattered from the blade 14 in response to illumination of the blade by the laser source 22 is detected by the at least one photodetector 26. As shown in FIG. 6, preferably the underside of the blade 14 that faces the fuselage 12 of the rotorcraft 10, may be illuminated by radiation generated by the laser source 22. The radiation scattered by the blade 14 in response to the illumination is then detected by the at least one photodetector 26.

Figure 5:
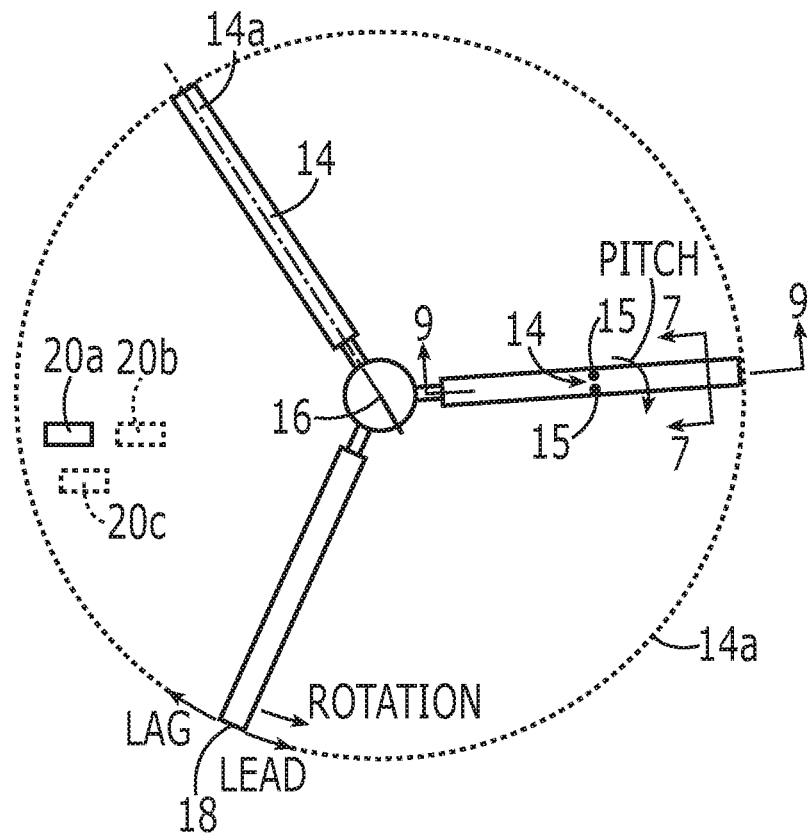
FIG. 5 is a top view of a plurality of blades of a rotorcraft and a rotation path of the blades relative to a plurality of track sensors carried by a rotorcraft in accordance with an example embodiment of the present disclosure.

While a blade positioning system 40 has been described that includes a single track sensor 20, the blade positioning system of an example embodiment may include a plurality of track sensors 20a, 20b and 20c, each of which is configured to separately illuminate the blade 14 and to receive radiation scattered from the blade in response to the illumination. Although the plurality of track sensors 20 may be mounted in various manners upon the fuselage 12 of the rotorcraft 10, FIG. 5 depicts the plurality of track sensors including a first track sensor 20a depicted in solid lines and a plurality of additional track sensors 20b and 20c depicted in dashed lines and offset angularly and/or radially form the first track sensor. By separately determining the blade position based upon the radiation that is scattered from the blade 14 and detected by a plurality of track sensors 20, the precision with which the blade position is determined may be improved based upon a combination, such as an averaging, of the blade positions determined by each of the plurality of track sensors. In addition, the incorporation of a plurality of track sensors 20 increases the redundancy and, in turn, the reliability of this blade positioning system 40.

As shown in FIG. 6, the blade 14 is repeatedly illuminated in accordance with an example embodiment at a location 19 closer to a distal end 18 of the blade than the rotor mast 16 about which the blade is rotated. In this regard, the track sensor 20 may be mounted upon the fuselage 12 so as to underlie the path of rotation of the blades 14, but at a location that is closer to the periphery or circumference of the path of rotation (as shown by dashed line 14a in FIG. 5) than the rotor mast 16. In this regard, the location 19 at which the blade 14 is illuminated may be spaced from the distal end 18 of the blade by a distance $d_1$ and may be spaced from the rotor mast 16 by a distance $d_2$. Since the location 19 at which the blade 14 is illuminated is closer to the distal end 18 of the blade than the rotor mast 16, the distance $d_1$ is less than the distance $d_2$. By repeatedly illuminating the blade 14 at a location closer to the distal end 19 of the blade than the rotor mast 16, the method and blade positioning system 40 of an example embodiment may determine the blade position with more precision and accuracy as at least some variations in the blade position are more pronounced proximate the distal end of the blade than proximate the rotor mast.

Figure 7:
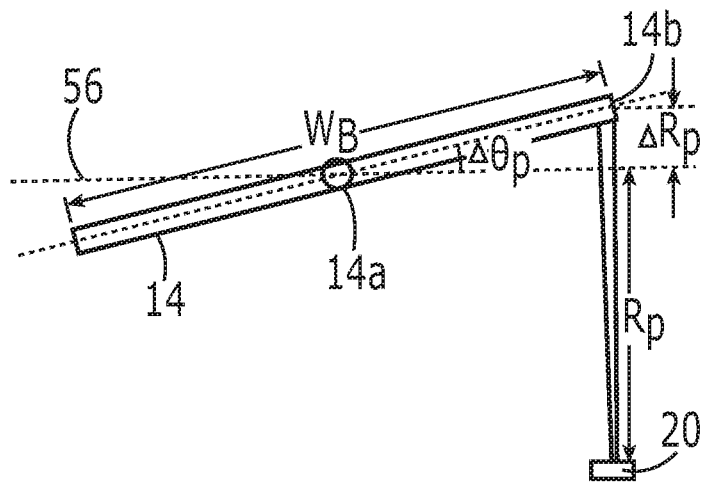
FIG. 7 is another side view of a portion of a blade in lateral cross-section along line 7-7 of FIG. 5 that depicts the determination of the blade pitch angle in accordance with an example embodiment of the present disclosure.
Figure 8:
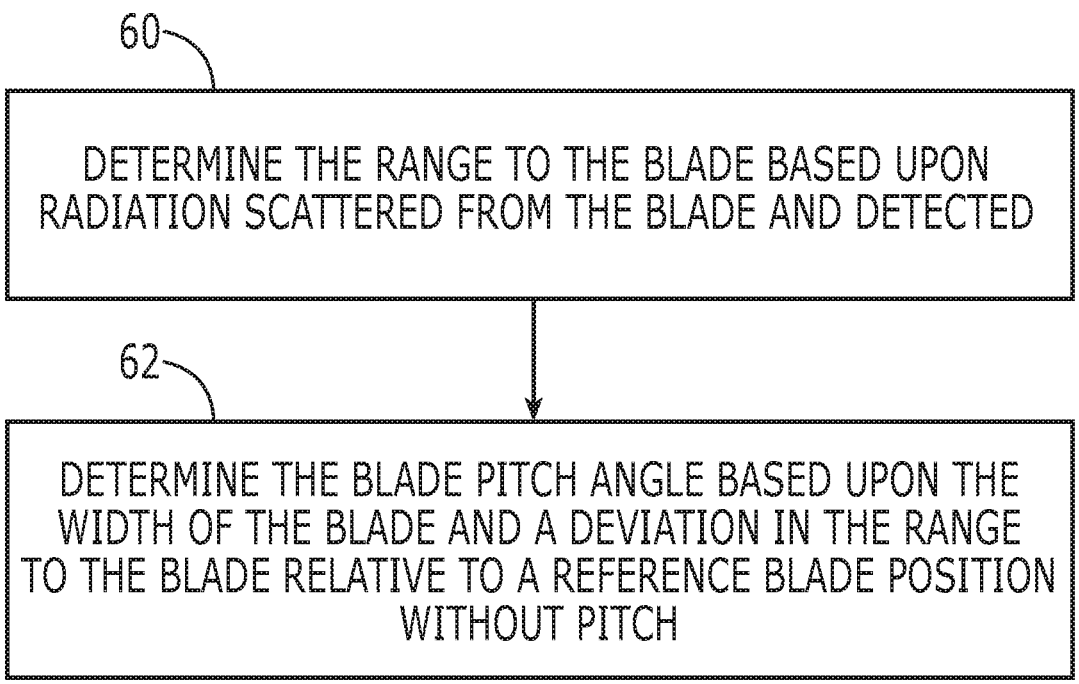
FIG. 8 is a flow chart illustrating the operations performed in order to determine the blade pitch angle in accordance with an example embodiment of the present disclosure.

As shown in block 54 of FIG. 4, at least one of the blade pitch angle, the blade flap angle, the blade leading position or the blade lagging position is determined, such as by the processing circuitry 42, based upon the radiation that is scattered from the blade 14 and detected, such as by the at least one photodetector 26 of the track sensor 20. As described below, the blade pitch angle and the blade flap angle are determined, at least in part, based upon the range to the blade 14. The range to the blade 14 defines the distance between the chip-scale LIDAR sensor 21 and the portion of the blade 14 that is illuminated. In this regard, the range may define either the distance between the chip-scale LIDAR sensor 21 and the portion of the blade 14 that is illuminated or the round trip distance traveled by the radiation between the chip-scale LIDAR sensor 21 and the portion of the blade 14 that is illuminated. As shown in FIG. 7 and in block 60 of FIG. 8, the processing circuitry 42 is configured to determine the range to the blade 14 based upon the radiation that is generated by the laser source 22 and scattered from the blade and then, in turn, detected by the at least one photodetector 26. For example, based upon the optical frequency shift between the transmission of the radiation generated by the FMCW laser source 22 and the detection of scattered radiation based thereupon, the processing circuitry 42 is configured to determine the range to the blade 14.

With respect to the blade pitch angle, the processing circuitry 42 of this example embodiment is also configured to determine the blade pitch angle based upon the width $W_B$ of the blade 14 and the deviation of the range to the blade relative to the range to a reference blade position without pitch, such as the position of a flat blade that would lie along the horizontal axis 56 in the example embodiment of FIG. 7. See block 62 of FIG. 8. The width of the blade 14 may be predefined and, in some embodiments, the range to a reference blade position without pitch may also be predefined. In other embodiments, however, the range to the reference blade position without pitch may be defined by the range to the blade 14 at the blade center axis 14a, that is, the axis that extends radially outward from the rotor mast 16 to the distal end 18 of the blade and that is located width-wise in the center of the blade. Thus, the track sensor 20 of an example embodiment may be configured to repeatedly illuminate the blade 14 including illumination of the blade at the blade center axis 14a and illumination of the blade at another location laterally offset from the blade center axis. As shown in FIG. 7 and in this example embodiment, the track sensor 20 may be configured to illuminate the blade 14 at the lateral edge 14b of the blade such that the determination of the range and, as a result, the determination of the deviation of the range may be based upon the range at the lateral edge of the blade.

In an example embodiment depicted in FIG. 7, the processing circuitry 42 is configured to determine the blade pitch angle $\Delta\theta_P$ in accordance with the following relationship:

$$\Delta R_P = \frac{W_B \sin(\Delta\theta_P)}{2}$$

wherein $W_B$ is the width of the blade 14 and $\Delta R_P$ is the deviation in the range to the blade relative to the range to a reference blade position without pitch, that is $R_P$.

In an example, the width of the blade 14 is 533 millimeters and the blade pitch angle is anticipated to vary within the range of +6 degrees to −6 degrees from the blade flat position for a total angular range of potential blade pitch angles of 12 degrees. In an embodiment in which the blade pitch angle resolution is to be 0.1 degrees for a total of 120 resolved blade pitch angular positions, the resolution with which the deviation in range is determined is 0.5 millimeters. This resolution in terms of the determination of the deviation $\Delta R_P$ of the range is, in turn, dependent of upon the extent of the optical frequency modulation $\Delta f$ and is defined as:

$$\Delta R_P = \frac{c}{2\Delta f}$$

wherein c is the speed of light. Thus, in this example embodiment, the track sensor 20 is configured to provide at least about 300 GHz of optical frequency modulation in the ramp waveform.

Figure 9:
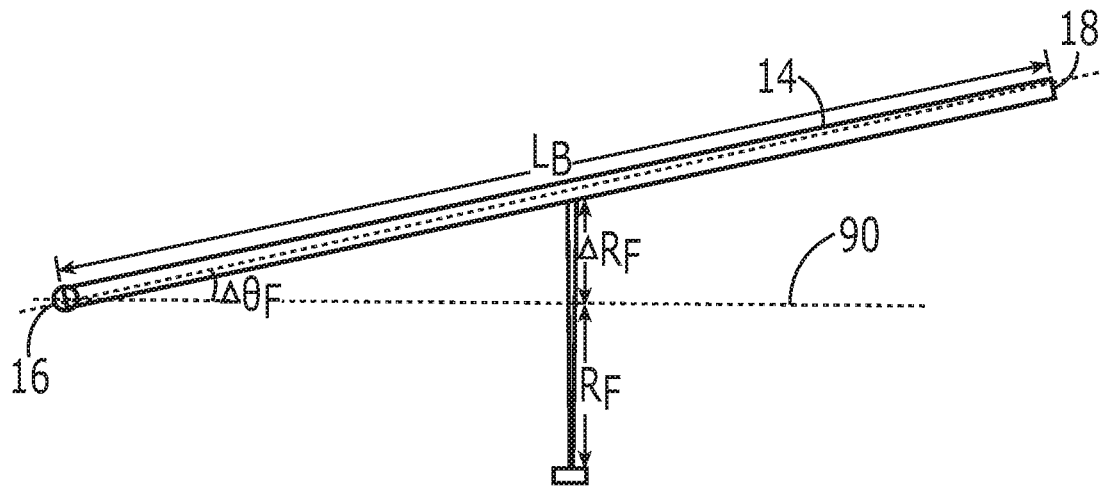
FIG. 9 is another side view of a blade in longitudinal cross-section along line 9-9 of FIG. 5 that depicts the determination of the blade flap angle in accordance with an example embodiment of the present disclosure.
Figure 10:
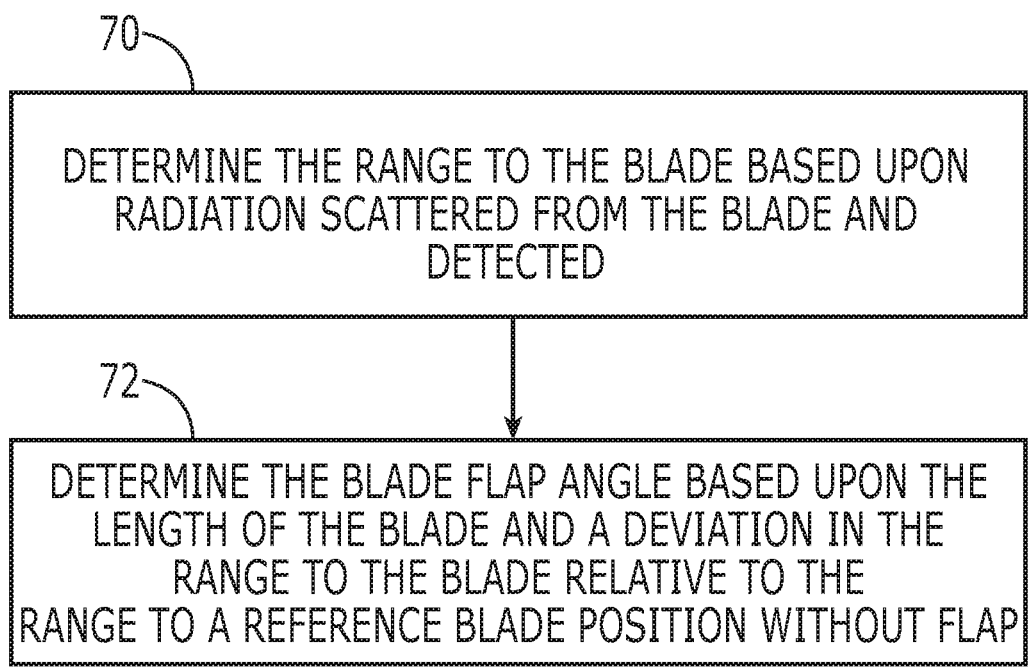
FIG. 10 is a flow chart illustrating the operations performed in order to determine the blade flap angle in accordance with an example embodiment of the present disclosure.

With respect to the determination of the blade flap angle and in reference to FIG. 9 and block 70 of FIG. 10, the processing circuitry 42 is configured to determine the range to the blade 14 based upon the radiation that is scattered from the blade and detected, such as described above in conjunction with the determination of the blade pitch angle. The processing circuitry 42 of this example embodiment is also configured to determine the blade flap angle based upon the length of the blade 14 and a deviation in the range to the blade relative to the range to a reference blade position without flap, such as the position of a blade without flap that would lie along the horizontal axis 90 in the example embodiment of FIG. 7. See block 72 of FIG. 10. The range to the reference blade position without flap may be predefined or may be determined by the track sensor 20 and processing circuitry 42 in an instance in which the blade position has been confirmed to be without flap. In an example embodiment, the processing circuitry 42 is configured to determine the blade flap angle $\Delta\theta_F$ based upon the following:

$$\Delta R_F = \frac{L_B \sin(\Delta\theta_F)}{2}$$

wherein $L_B$ is the length of the blade 14, such as from the rotor mast 16 to the distal end 18 of the blade and $\Delta R_F$ is the deviation in the range to the blade relative to the range to a reference blade position without pitch, that is $R_F$. The length of the blade 14 may be predefined.

In an example embodiment in which the length of the blade is 7468 millimeters, the flap angle is anticipated to vary in a range of +1 degree to −1 degree from the blade flat position for a total of 2 degrees of range in the blade flap angle. In this example embodiment, the blade positioning system 40 and method may be configured to determine the blade flap angle with a resolution of 0.1 degrees, such as for a total of 20 resolved blade flap angular positions. In this example embodiment, the processing circuitry 42 is configured to determine the range to the blade 14 with a resolution of approximately 6.5 millimeters such that the laser source 22 of the track sensor 20 of this example embodiment should provide about 23 GHz of optical frequency modulation in the ramp waveform.

Figure 11:
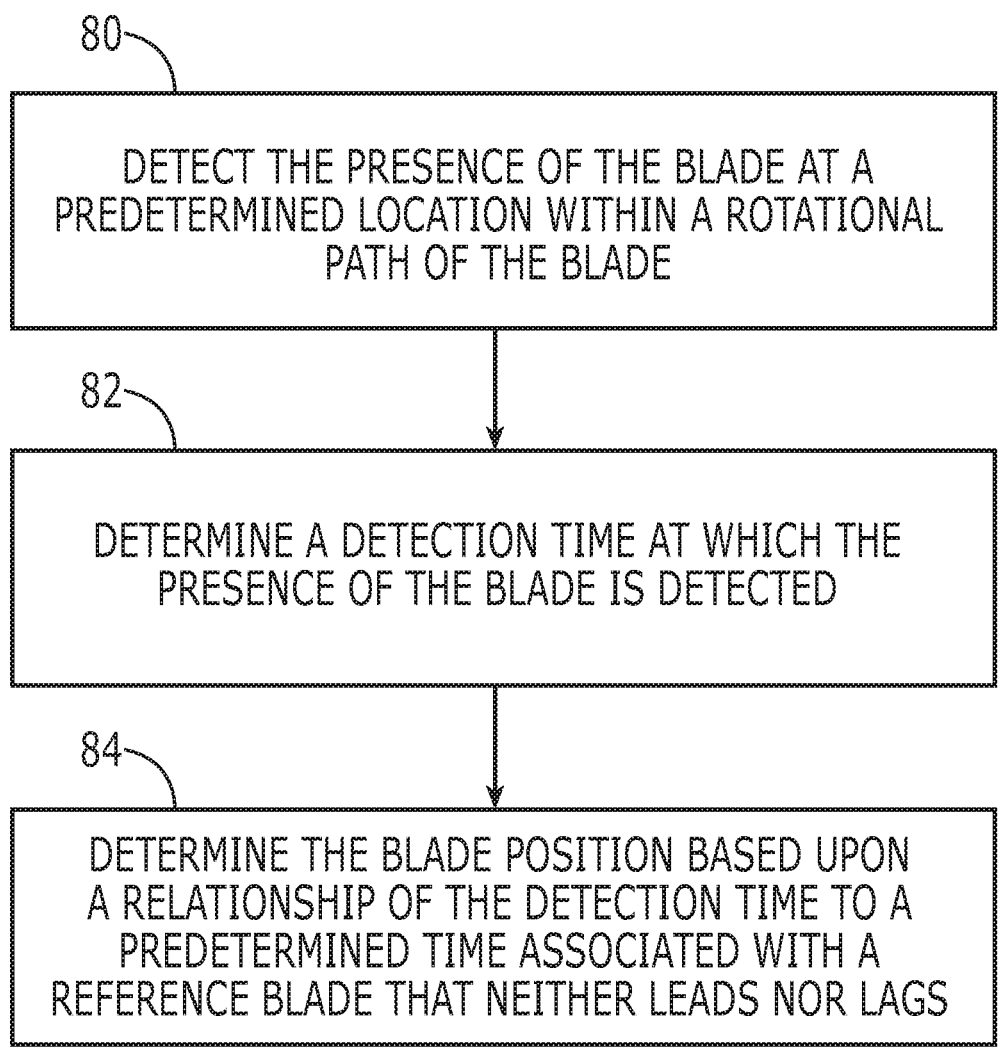
FIG. 11 is a flow chart illustrating the operations performed in order to determine the blade position in terms of lead or lag in accordance with an example embodiment of the present disclosure.

In another example embodiment, the processing circuitry 42 is configured to determine the blade position, such as a blade leading position or a blade lagging position, by determining the presence of the blade 14 at a predefined location, that is, a predefined angular location, within the rotational path of the blade and determining the detection time at which the presence of the blade is detected. See blocks 80 and 82 of FIG. 11. The blade leading position and the blade lagging position are relative to a blade 14 that is properly angularly positioned with respect to the rotor mast 16. A blade 14 in a blade leading position is angularly advanced in the direction of rotation, while a blade in a blade lagging position is angularly retarded in the direction of rotation. For a rotorcraft 10 having three blades 14, the blades may be properly angularly positioned in an instance in which the blades are spaced apart by 120°. In this example, a blade 14 has a blade leading position in an instance in which the angle defined between the blade and the properly positioned, preceding blade in the direction of rotation is less than 120°. Conversely, a blade has a blade lagging position in an instance in which the angle defined between the blade and the properly positioned, subsequent blade in the direction of rotation is less than 120°.

Additionally, the presence of the blade 14 is defined the detection by the chip-scale LIDAR sensor 21 of radiation scattered by the blade. In this regard, the plurality of blades 14 rotate above the chip-scale LIDAR sensor 21. For a respective blade 14, the radiation generated by the chip-scale LIDAR sensor 21 is not generally incident upon and scattered by the respective blade as the respective blade does not overlie the chip-scale LIDAR sensor and is not illuminated by the radiation generated thereby. However, for fraction of the time that is required for the blades 14 to complete a single rotation about the rotor mast 16, the respective blade will overlie the chip-scale LIDAR sensor 21 and be illuminated by and scatter the radiation generated by the chip-scale LIDAR sensor. Upon detecting the radiation scattered by the respective blade 14, the chip-scale LIDAR sensor 21 will detect the presence of the respective blade. In this regard, the processing circuitry 42 may be configured to identify, based upon scattered radiation detected by the track sensor 20, the time at which the leading edge of the blade 14 (or the trailing edge of the blade) is detected, thereby determining the time at which the respective edge of the blade is detected. For a properly positioned blade 14 that is neither leading or lagging, the time at which the blade is to be detected by the track sensor 20 may be predetermined, such as based upon the rotational speed of the blade and an initial position of the blade.

In this example embodiment, the processing circuitry 42 is configured to determine the blade position based upon a relationship between the detection time and the predetermined time at which a properly positioned blade that neither leads nor lags would have been detected. See block 84 of FIG. 11. In this regard, the processing circuitry 42 is configured to determine the blade position by determining that the blade 14 is leading in an instance in which the detection time precedes the predetermined time, that is, in an instance in which the blade positioning system 40 detects the presence of the blade prior to the time at which the blade positioning system anticipates detecting the presence of a properly positioned blade. The processing circuitry 42 of this example embodiment is also configured to determine that the blade 14 is lagging in an instance in which the detection time trails the predetermined time, such as in an instance in which the blade positioning system 40 detects the presence of the blade after the predetermined time at which the blade positioning system anticipates detecting the presence of a properly positioned blade. Based upon the difference between the detection time and the predetermined time, the blade positioning system 40 is not only configured to determine that the blade 14 is either leading or lagging, but is also configured to determine the angular amount by which the blade is leading or lagging based upon the rotational speed of the blades and the difference between the detection time and the predetermined time.

As shown in FIG. 3, the blade positioning system 40 of an example embodiment also includes one or more actuators 44. In this example embodiment, the one or more actuators are responsive to the processing circuitry 42 and are configured to modify the position of the blade 14 during flight based upon the blade position that has been determined. For example, the blade positioning system 40 may include a blade pitch actuator 44a configured to modify the blade pitch based upon the blade pitch angle that has been determined, such that the blade 14 may be returned to a flat position during flight. Similarly, the blade positioning system 40 may include a blade flap actuator 44b configured to modify the blade flap based upon the blade flap angle that has been determined, such that the blade 14 may be returned to a flat position during flight. Additionally, the blade positioning system 40 may include a blade angular position actuator 44c configured to modify the blade position, such as the blade angular position, based upon the determination as to whether the blade 14 is leading or lagging, such that the blade may be returned to the desired angular position that is neither leading nor lagging. Thus, the blade positioning system 40, such as the at least one actuator 44, is configured to controllably modify the position of the blade 14 during flight so as to offset any variations in the blade position and to return the blade to the desired position, thereby improving the flight conditions, such as by causing the flight to be smoother, without having to await completion of the flight and/or return of the rotorcraft to a maintenance depot or other facility able to effect the necessary repairs.

The radiation generated by the laser source 22 illuminates the blade 14 and has a limited dwell time $T_B$ with the dwell time depending upon the blade rotation speed UR and the position of the track sensor 20 relative to the axis about which the blade rotates, such as defined in terms of the radius R from the axis about which the blade rotates to the track sensor, as defined as:

$$T_B = \frac{W_B}{2\pi \overline{R} v_R}$$

wherein $v_R$ is the blade rotation speed.

For the example of the blade 14 having the dimensions described above, the minimum dwell time of the radiation generated by the track sensor 20 upon the blade 14 in an instance in which the track sensor is positioned closer to the distal end 18 of the blade than the rotor mast 16 is about 5 milliseconds for a blade having a rotational speed of 258 revolutions per minute (RPM). In an embodiment in which the beam size of the radiation generated by the laser source 22 of the track sensor 20 is about 3 millimeters, the spot size of the radiation on the blade 14 that is spaced 3 meters apart from the track sensor is about 7 millimeters. In this example embodiment, the single track sensor 20 generates about 78 measurements points across the width of the blade 14 during a single rotation (two of which are depicted by dots 15 in FIG. 5) with a measurement time (or integration time) of about 64 microseconds for each measurement. In this regard, the measurement time is the time dedicated following illumination of the blade 14 for the radiation to be scattered from the blade and subsequently detected by at least one photodetector 26 of the track sensor 20. In an embodiment in which the range is desired to be measured with an increased accuracy or resolution, the measurement time, that is, the integration time, for each measurement point is increased, thereby reducing the number of measurement points across the width of the blade 14. For example, if the measurement time, that is, the integration time, is increased to about 5 milliseconds, the track sensor 20 may be configured to generate 5 measurement points across the width of the blade 14.

Figure 12:
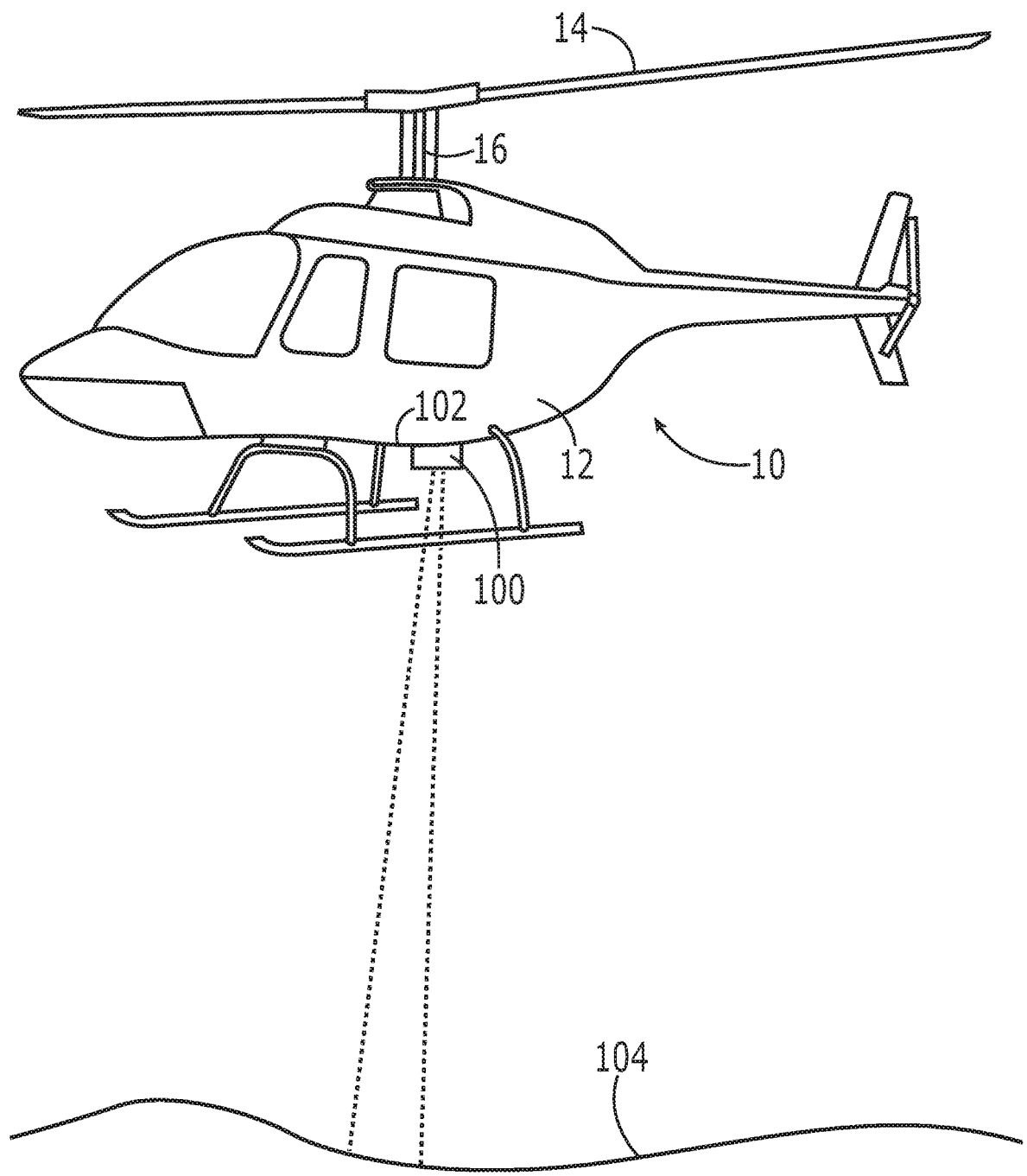
FIG. 12 is a perspective view of a rotorcraft having a chip-scale LIDAR sensor mounted to a lower surface of a fuselage in order to provide altitude measurements in accordance with another example embodiment of the present disclosure.

As described above, the chip-scale LIDAR sensor 21 may be utilized in order to determine the blade position, thereby permitting the blade position to be modified during flight in a controlled manner. Alternatively, the chip-scale LIDAR sensor 21 may be utilized as or in conjunction with an altimeter in order to determine the altitude of the rotorcraft 10 above a surface, such as during landing of the rotorcraft. In this example embodiment and as depicted in FIG. 12, an altitude sensor 100 including the chip-scale LIDAR sensor 21 may be mounted on a lower surface 102 of the fuselage 12 of the rotorcraft 10 and configured to illuminate a surface 104 beneath the rotorcraft, such as the terrain upon which the rotorcraft is planning to land, as shown by the downwardly diverging dashed lines. Based upon the optical frequency shift between the generation of radiation by the laser source 22 of the chip-scale LIDAR sensor 21 and the detection of radiation scattered by the underlying terrain by the at least one photodetector 26 in response to illumination by the radiation, the range to the underlying terrain, such as the altitude of the rotorcraft 10, may be determined, such as by the processing circuitry 42. As such, the rotorcraft 10 may be maneuvered relative to the underlying terrain, such as by landing the rotorcraft upon terrain, in a controlled manner.

FIGS. 4, 8, 10 and 11 illustrate flowcharts describing the operation of apparatuses, methods, and computer program products according to examples of the disclosure. It will be understood that each block of the flowcharts, and combinations of blocks in the flowcharts, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of a blade positioning system 40 employing an example of the present disclosure and executed by processing circuitry 42 of the computing device. As will be appreciated, any such software instructions may be loaded onto a computer or other programmable apparatus (e.g., hardware) to produce a machine, such that the resulting computer or other programmable apparatus implements the functions specified in the flowchart blocks. These software instructions may also be stored in a computer-readable memory that may direct a computer or other programmable apparatus to function in a particular manner, such that the software instructions stored in the computer-readable memory produce an article of manufacture, the execution of which implements the functions specified in the flowchart blocks. The software instructions may also be loaded onto a computer or other programmable apparatus to cause a series of operations to be performed on the computer or other programmable apparatus to produce a computer-implemented process such that the software instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and software instructions.

In some examples, some of the operations above may be modified or further amplified. Furthermore, in some examples, additional optional operations may be included. Modifications, amplifications, or additions to the operations above may be performed in any order and in any combination.

Many modifications and other examples of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific examples disclosed and that modifications and other examples are intended to be included within the scope of the appended claims. Moreover, although the foregoing descriptions and the associated drawings describe examples in the context of certain combinations of elements and/or functions, it should be appreciated that different combinations of elements and/or functions may be provided by alternative examples without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

That which is claimed:

1. A method for dynamically measuring blade position during flight of a rotorcraft, the method comprising:
   repeatedly illuminating a blade of the rotorcraft with coherent light while the blade is rotating;
   detecting radiation scattered from the blade in response to illumination of the blade;
   determining at least one of a blade pitch angle, a blade flap angle, a blade leading position or a blade lagging position based upon the radiation that is scattered from the blade and detected; and
   modifying the blade position during the flight of the rotorcraft based on the at least one of the blade pitch angle, the blade flap angle, the blade leading position or the blade lagging position that has been determined.

2. A method according to claim 1, wherein repeatedly illuminating the blade of the rotorcraft comprises repeatedly illuminating the blade at a location closer to a distal end of the blade than a rotor mast about which the blade is rotated.

3. A method according to claim 1, wherein repeatedly illuminating the blade of the rotorcraft comprises repeatedly illuminating the blade with a plurality of track sensors positioned at different locations upon a fuselage of the rotorcraft.

4. A method according to claim 1, wherein determining the blade pitch angle comprises:
   determining a range to the blade based upon the radiation that is scattered from the blade and detected; and
   determining the blade pitch angle based upon a width of the blade and a deviation in the range to the blade relative to a range to a reference blade position without pitch.

5. A method according to claim 4 wherein repeatedly illuminating the blade comprises repeatedly illuminating the blade with radiation generated by a laser source, and wherein determining the range comprises determining the range between the laser source and an edge of the blade.

6. A method according to claim 1, wherein determining the blade flap angle comprises:
   determining a range to the blade based upon the radiation that is scattered from the blade and detected; and
   determining the blade flap angle based upon a length of the blade and a deviation in the range to the blade relative to a range to a reference blade position without flap.

7. A method according to claim 1, wherein determining the blade leading position or the blade lagging position comprises:
   detecting presence of the blade at a predefined location within a rotational path of the blade;
   determining a detection time at which the presence of the blade is detected; and
   determining a blade position based upon a relationship of the detection time to a predetermined time associated with a reference blade that neither leads nor lags, wherein determining the blade position comprises determining the blade leading position in an instance in which the detection time precedes the predetermined time and determining the blade lagging position in an instance in which the detection time trails the predetermined time.

8. A blade positioning system for dynamically measuring blade position during flight of a rotorcraft, the blade positioning system comprising:
   a track sensor mounted upon the rotorcraft, the track sensor comprising:
      a laser source configured during flight of the rotorcraft to repeatedly illuminate a blade of the rotorcraft with coherent light while the blade is rotating; and
      at least one photodetector configured to detect radiation scattered from the blade in response to illumination of the blade;
   processing circuitry, responsive to the track sensor, configured to determine at least one of a blade pitch angle, a blade flap angle, a blade leading position or a blade lagging position based upon the radiation that is scattered from the blade and detected by the at least one photodetector; and
   an actuator, responsive to the processing circuitry, configured to modify the blade position during flight of the rotorcraft based upon the at least one of the blade pitch angle, the blade flap angle, the blade leading position or the blade lagging position as determined by the processing circuitry.

9. A blade positioning system according to claim 8, wherein the track sensor is mounted upon the rotorcraft such that the laser source is configured to repeatedly illuminate the blade at a location closer to a distal end of the blade than a rotor mast about which the blade is rotated.

10. A blade positioning system according to claim 8, further comprising a plurality of track sensors mounted at different locations upon the rotorcraft.

11. A blade positioning system according to claim 8, wherein the processing circuitry being configured to determine the blade pitch angle comprises the processing circuitry being configured to:
   determine a range to the blade based upon the radiation that is scattered from the blade and detected; and
   determine the blade pitch angle based upon a width of the blade and a deviation in the range to the blade relative to a range to a reference blade position without pitch.

12. A blade positioning system according to claim 11 wherein the processing circuitry being configured to determine the range comprises the processing circuitry being configured to determine the range between the laser source and an edge of the blade.

13. A blade positioning system according to claim 8, wherein the processing circuitry being configured to determine the blade flap angle comprises the processing circuitry being configured to:
   determine a range to the blade based upon the radiation that is scattered from the blade and detected; and
   determine the blade flap angle based upon a length of the blade and a deviation in the range to the blade relative to a range to a reference blade position without flap.

14. A blade positioning system according to claim 8, wherein the track sensor is configured to detect presence of the blade at a predefined location within a rotational path of the blade, and wherein the processing circuitry being configured to determine the blade leading position or the blade lagging position comprises the processing circuitry being configured to:

determine a detection time at which the presence of the blade is detected; and determine a blade position based upon a relationship of the detection time to a predetermined time associated with a reference blade that neither leads nor lags, wherein the processing circuitry being configured to determine the blade position comprises the processing circuitry being configured to determine the blade leading position in an instance in which the detection time precedes the predetermined time and to determine the blade lagging position in an instance in which the detection time trails the predetermined time.

15. A blade positioning system according to claim 8, further comprising one or more additional track sensors mounted on the rotorcraft such that the one or more additional track sensors are offset at least one of angularly or radially from the track sensor.

16. A blade positioning system according to claim 8, wherein the laser source of the track sensor is configured to illuminate the blade of the rotorcraft at a location spaced from a distal end of the blade and spaced from a rotor mast about which the blade rotates, wherein the location at which the track sensor is configured to illuminate the blade of the rotorcraft is closer to the distal end of the blade than to the rotor mast.

17. A rotorcraft comprising:
a fuselage;
a plurality of blades configured to rotate relative to the fuselage;
a chip-scale light detection and ranging (LIDAR) sensor carried by the fuselage and comprising:
a laser source configured to provide illumination with coherent light during flight of the rotorcraft; and
at least one photodetector configured to detect radiation that has been scattered in response to the illumination provided by the laser source,
wherein the chip-scale LIDAR sensor is carried by the fuselage such that the laser source is configured to illuminate the plurality of blades while the blades are rotating in order to permit blade position to be measured or to illuminate terrain beneath the rotorcraft in order to provide an altitude measurement;

processing circuitry, responsive to the chip-scale LIDAR sensor, configured to determine at least one of a blade pitch angle, a blade flap angle, a blade leading position or a blade lagging position based upon the radiation that is scattered from a respective blade of the plurality of blades and detected by the at least one photodetector; and an actuator, responsive to the processing circuitry, configured to modify a position of the respective blade during flight based upon the at least one of the blade pitch angle, the blade flap angle, the blade leading position or the blade lagging position as determined by the processing circuitry.

18. A rotorcraft according to claim 17, wherein the laser source comprises a frequency modulated continuous wave laser diode.

19. A rotorcraft according to claim 17, wherein the at least one photodetector comprises a pair of dual-balanced photodetectors.

20. A rotorcraft according to claim 17, wherein the chip-scale LIDAR sensor further comprises:
a splitter configured to split light generated by the laser source into first and second portions with the first portion being directed to illuminate the plurality of blades while the blades are rotating or to illuminate terrain beneath the rotorcraft;
a waveguide configured to support propagation of the second portion of the light generated by the laser source; and
a coupler configured to couple the second portion of the light propagating along the waveguide with the radiation that has been scattered in response to the illumination provided by the laser source,
wherein the at least one photodetector is responsive to the coupler and is configured to receive the second portion of the light propagating along the waveguide with the radiation that has been scattered in response to the illumination provided by the laser source from the coupler.

\* \* \* \* \*